(12) United States Patent
Cerri et al.

(10) Patent No.: US 9,837,668 B2
(45) Date of Patent: Dec. 5, 2017

(54) COST-EFFECTIVE CORE-SHELL CATALYST WITH HIGH ELECTROCHEMICAL STABILITY

(75) Inventors: Isotta Cerri, Steenokkerzeel (BE); Tetsuo Nagami, Aichi (JP); Brian Elliott Hayden, Lyndhurst Hampshire (GB); Jonathan Conrad Davies, Southhampton Hampshire (GB)

(73) Assignees: Toyota Motor Europe NV/SA, Brussels (BE); Ilika Technologies Ltd., Southampton, Hampshire (GB)

( * ) Notice: Subject to any disclaimer, the term of this patent is extended or adjusted under 35 U.S.C. 154(b) by 423 days.

(21) Appl. No.: 14/112,373

(22) PCT Filed: Jul. 25, 2011

(86) PCT No.: PCT/EP2011/062768
§ 371 (c)(1),
(2), (4) Date: Oct. 17, 2013

(87) PCT Pub. No.: WO2013/013704
PCT Pub. Date: Jan. 31, 2013

(65) Prior Publication Data
US 2014/0193746 A1 Jul. 10, 2014

(51) Int. Cl.
*H01M 4/86* (2006.01)
*B01J 21/06* (2006.01)
(Continued)

(52) U.S. Cl.
CPC .......... *H01M 4/8657* (2013.01); *B01J 21/06* (2013.01); *B01J 23/42* (2013.01); *B01J 23/6484* (2013.01);
(Continued)

(58) Field of Classification Search
CPC .... H01M 4/366; H01M 4/8657; H01M 4/921; H01M 4/92; H01M 4/9016;
(Continued)

(56) References Cited

U.S. PATENT DOCUMENTS 5,723,404 A 3/1998 Butje et al.
6,783,569 B2 8/2004 Cheon et al.
(Continued)

FOREIGN PATENT DOCUMENTS

CN 101455970 6/2009
EP 1 524 711 A2 9/2004
(Continued)

OTHER PUBLICATIONS

Thanh B. Do, Mei Cai, Martin S. Ruthkosky, Thomas E. Moylan, Niobium-doped titanium oxide for fuel cell application, Electrochimica Acta, vol. 55, Issue 27, Nov. 30, 2010, pp. 8013-8017.*
(Continued)

*Primary Examiner* — Milton I Cano
*Assistant Examiner* — Philip A Stuckey
(74) *Attorney, Agent, or Firm* — Finnegan, Henderson, Farabow, Garrett & Dunner, LLP

(57) ABSTRACT

A core-shell composite material may include a core consisting of Nb-doped $TiO_2$ of formula $TiNbO_x$; and a shell consisting of a homogeneous layer of Pt or Pt alloy of 1 to 50 ML in thickness. The core-shell composite material may in particular find application in fuel cells.

15 Claims, 10 Drawing Sheets

(51) Int. Cl.
  *B01J 23/42* (2006.01)
  *B01J 23/648* (2006.01)
  *B01J 35/00* (2006.01)
  *B01J 37/02* (2006.01)
  *H01M 4/90* (2006.01)
  *H01M 4/92* (2006.01)
  *H01M 8/1018* (2016.01)

(52) U.S. Cl.
  CPC ......... *B01J 35/008* (2013.01); *B01J 37/0221* (2013.01); *H01M 4/9016* (2013.01); *H01M 4/92* (2013.01); *H01M 4/921* (2013.01); *H01M 2008/1095* (2013.01)

(58) Field of Classification Search
  CPC .............. H01M 2008/1095; B01J 21/06; B01J 37/0221; B01J 35/008; B01J 23/6484; B01J 23/42
  See application file for complete search history.

(56) References Cited

U.S. PATENT DOCUMENTS

| | | |
|---|---|---|
| 7,053,021 B1 | 5/2006 | Zhong et al. |
| 7,704,918 B2 | 4/2010 | Adzic et al. |
| 7,855,021 B2 | 12/2010 | Adzic et al. |
| 2005/0085379 A1 | 4/2005 | Ishihara et al. |
| 2006/0263675 A1 | 11/2006 | Adzic et al. |
| 2007/0026292 A1 | 2/2007 | Adzic et al. |
| 2007/0031722 A1 | 2/2007 | Adzic |
| 2007/0037041 A1 | 2/2007 | Cai et al. |
| 2007/0082257 A1 | 4/2007 | Tamura et al. |
| 2007/0105005 A1 | 5/2007 | Tolmachev |
| 2007/0264492 A1 | 11/2007 | Mizuno et al. |
| 2008/0008924 A1 | 1/2008 | Xiong et al. |
| 2008/0220296 A1 | 9/2008 | Eichhorn et al. |
| 2009/0065738 A1 | 3/2009 | Weidner et al. |
| 2009/0114061 A1 | 5/2009 | Strasser et al. |
| 2009/0117257 A1 | 5/2009 | Monnier et al. |
| 2010/0105548 A1 | 4/2010 | Zhang et al. |
| 2010/0197490 A1 | 8/2010 | Adzic |
| 2012/0122019 A1 | 5/2012 | DiSalvo, Jr. et al. |
| 2012/0202683 A1 | 8/2012 | Shirvanian |
| 2012/0295184 A1 | 11/2012 | Watanabe et al. |
| 2012/0309615 A1 | 12/2012 | Shao et al. |
| 2013/0022899 A1 | 1/2013 | Arai et al. |
| 2013/0136687 A1 | 5/2013 | Darr et al. |

FOREIGN PATENT DOCUMENTS

| | | |
|---|---|---|
| EP | 1 859 861 A1 | 11/2007 |
| EP | 1 925 592 A2 | 5/2008 |
| EP | 2 557 203 A1 | 2/2013 |
| JP | 2000-237588 A | 9/2000 |
| JP | 2002-219361 A | 8/2002 |
| JP | 2004-259908 A | 9/2004 |
| JP | 2005-013946 A | 1/2005 |
| JP | 2005-100713 A | 4/2005 |
| WO | WO 99/56872 | 11/1999 |
| WO | WO 2008/025751 A1 | 3/2008 |
| WO | WO 2009/041543 A3 | 4/2009 |
| WO | WO 2009/152003 | 12/2009 |
| WO | WO 2009/157033 A2 | 12/2009 |
| WO | WO 2010/005773 A1 | 1/2010 |
| WO | WO 2010/135576 A8 | 11/2010 |
| WO | WO 2011/065471 | 6/2011 |
| WO | WO 2012/041340 | 4/2012 |
| WO | WO 2012/105978 A1 | 8/2012 |
| WO | WO 2012/125138 A1 | 9/2012 |
| WO | WO 2012/144974 A1 | 10/2012 |

OTHER PUBLICATIONS

Chhina, H., Susac, D., Campbell, S., & Kesler, O. (2009). Transmission electron microscope observation of Pt deposited on Nb-doped titania.Electrochemical and Solid-State Letters, 12(6), B97-B100.*

Chhina, H., Campbell, S., & Kesler, O. (2009). Ex situ and in situ stability of platinum supported on niobium-doped titania for PEMFCs. Journal of the Electrochemical Society, 156(10), B1232-B1237.*

Sheng-Yang Huang, Prabhu Ganesan, Branko N. Popov, Electrocatalytic activity and stability of niobium-doped titanium oxide supported platinum catalyst for polymer electrolyte membrane fuel cells, Applied Catalysis B: Environmental, vol. 96, Issues 1-2, Apr. 26, 2010, pp. 224-231.*

Do, T.B. et al., "Nobium-diped titanium oxide for fuel cell application," Electrochimica Acta 55, (2010), pp. 8013-8017.

Bing, Y. et al., "Nanostructured Pt-alloy electrocatalysts for PEM fuel cell oxygen reduction reaction," Chem. Soc. Rev., 2010, 39, pp. 2184-2202.

Lin, Qiang, et al., "Hydrogenation of Pyrene using Pd Catalysts Supported on Tungstated Metal Oxides", Applied Catalysis A: General, 387 (2010) pp. 166-127.

Sasaki, Kotaro, et al., "Core-Protected Platinum Monolayer Shell High-Stability Electrocatalysts for Fuel-Cell Cathodes," Angew. Chem. Int. Ed., 49 (2010) pp. 8602-8607.

Wang, Rongfang, et al., "Preparation of Carbon-Supported Core@shell PdCu@PtRu Nanoparticles for Methanol Oxidation," Journal of Power Sources, 195 (2010), pp. 1099-1102.

Guo, Dao-Jun, et al., "Highly Catalytic Activity of Pt Electrocatalyst Supported on Sulphated $SnO_2$/Multi-Walled Carbon Nanotube Composites for Methanol Electro-Oxidation," Journal of Power Sources, 198 (2012), pp. 127-131.

Antolini, E., et al., "Ceramic Materials as Supports for Low-Temperature Fuel Cell Catalysts," Solid State Ionics, 180 (2009) pp. 746-763.

Wu, Yan-Ni, et al., "High-Performance Core-Shell PdPt@Pt/C Catalysts via Decorating PdPt Alloy Cores with Pt," Journal of Power Sources, 194 (2009), pp. 805-810.

de Bruijn, F.A., et al., "Review: Durability and Degradation Issues of PEM Fuel Cell Components," Fuel Cells 08, (2008) No. 1, pp. 3-22.

Wang, Rongfang, et al., "Carbon Supported Pt-Shell Modified PdCo-Core with Electrocatalyst for Methanol Oxidation," International Journal of Hydrogen Energy, 35 (2010) pp. 10081-10086.

Wang, Shuangyin, et al., "Controlled Synthesis of Dendritic Au@Pt Core-Shell Nanomaterials for Use as an Effective Fuel Cell Electrocatalyst," Nanotechnology, 20 (2009) pp. 1-9.

00-041-1445, 2015 International Centre for Diffraction Data, (Aug. 18, 2015) pp. 1-2.

Akurati, Kranthi K., et al., "Flame-Made $WO_3$/$TiO_2$ Nanoparticles: Relation Between Surface Acidity, Structure and Photocatalytic Activity," Applied Catalysis B: Environmental, 79 (2008) pp. 53-62.

Harry, Gregory M., et al., "Titania-Doped Tantala / Silica Coatings for Gravitational-Wave Detection," Class. Quantum Gray. 24 (2007) pp. 405-415.

Guerin, Samuel, et al., "High-Throughput Synthesis and Screening of Ternary Metal Alloys for Electrocatalysis," J. Phys. Chem. B, 110 (2006) pp. 14355-14362.

Carotta, M.C., et al., "(Ti, Sn)$O_2$ Solid Solutions for Gas Sensing: A Systematic Approach by Different Techniques for Different Calcination Temperature and Molar Composition," Sensors and Actuators B, 139 (2009) pp. 329-339.

Cui, Xiangzhi, et al., "Graphitized Mesoporous Carbon Supported Pt-$SnO_2$ Nanoparticles as a Catalyst for Methanol Oxidation," Fuel, 89 (2010) pp. 372-377.

Peuckert, M., "Oxygen Reduction on Small Supported Platinum Particles," J. Electrochem. Soc.: Electrochemical Science and Technology, vol. 133, No. 5, (May 1986), pp. 944-947.

(56) References Cited

OTHER PUBLICATIONS

Wang, Wei, et al., "Pt Overgrowth on Carbon Supported PdFe Seeds in the Preparation of Core-Shell Electrocatalysts for the Oxygen Reduction Reaction," Journal of Power Sources, 195 (2010) pp. 3498-3503.
Xu, Zhuang, et al., "Effect of Particle Size on the Activity and Durability of the Pt/C Electrocatalyst for Proton Exchange Membrane Fuel Cells," Applied Catalysis B: Environmental, 111-112 (2012) pp. 264-270.
Chen, Yougui, et al., Atomic Layer Deposition Assisted $Pt-SnO_2$ Hybrid Catalysts on Nitrogen-Doped CNTs with Enhanced Electrocatalytic Activities for Low Temperature Fuel Cells, International Journal of Hydrogen Energy, 36 (2011) pp. 11085-11092.
Nagaveni, K., et al., "Structure and Photocatalytic Activity of $Ti_{1-x}M_xO_{2\pm\delta}$(M=W, V, Ce, Zr, Fe, and Cu) Synthesized by Solution Combustion Method", J. Phys. Chem. B 108 (2004) pp. 20204-20212.
Batzill, Matthias, et al., "The Surface and Materials Science of Tin Oxide," Progress in Surface Science 79 (2005) pp. 47-154.
Hayden, Brian E., et al., "The Influence of Pt Particle Size on the Surface oxidation of Titania Supported Platinum," Phys. Chem. Chem. Phys., 11 (2009) pp. 1564-1570.
Guerin, Samuel, et al., "Combinatorial Electrochemical Screening of Fuel Cell Electrocatalysts," J. Comb. Chem. 6, (2004) pp. 149-158.
Silva, J.C.M., et al., "Ethanol Oxidation Reactions Using $SnO_2$@Pt/C as an Electrocatalyst," Applied Catalysis B: Environmental, 99 (2010) pp. 265-271.
Hayden, Brian E., et al., "The Influence of Support and Particle Size on the Platinum Catalysed Oxygen Reduction Reaction," Phys. Chem. Chem. Phys., 11 (2009) pp. 9141-9148.
Ma, Yuanwei, et al., "High Active PtAu/C Catalyst with Core-Shell Structure for Oxygen Reduction Reaction," Catalysis Communications, 11 (2010) pp. 434-437.
Subban, Chinmayee V., et al., "Sol-Gel Synthesis, Electrochemical Characterization, and Stability Testing of $Ti_{0.7}W_{0.3}O_2$ Nanoparticles for Catalyst Support Applications in Proton-Exchange Membrane Fuel Cells," J. Am. Chem. Soc., 132 (2010) pp. 17531-17536.
Hartl, Katrin, et al., "AuPt Core-Shell Nanocatalysts with Bulk Pt Activity," Electrochemistry Communications, 12 (2010) pp. 1487-1489.
Wang, Yan-Jie, et al., "Noncarbon Support Materials for Polylmer Electrolyte Membrane Fuel Cell Electrocatalysts," Chem. Rev., 111 (2011) pp. 7625-7651.
Abadias, G., et al., "Structural and Photoelectrochemical Properties of $Ti_{1-x}W_xO_2$ Thin Films Deposited by Magnetron Sputtering," Surface & Coatings Technology, 205 (2011) pp. S265-S270.
Huang, Sheng-Yang, et al., "Electrocatalytic Activity and Stability of Niobium-Doped Titanium Oxide Supported Platinum Catalyst for Polymer Electrolyte Membrane Fuel Cells," Applied Catalysis B: Environmental, 96 (2010) pp. 224-231.
Gasteiger, Hubert A., et al., "Activity Benchmarks and Requirements for Pt, Pt-Alloy, and Non-Pt Oxygen Reduction Catalysts for PEMFCs," Applied Catalysis B: Environmental, 56 (2005) pp. 9-35.
Cappellani, A., et al., Processing and Characterisation of Sol-Gel Deposited $Ta_2O_5$ and $TiO_2-Ta_2O_5$ Dielectric Thin Films, Solid-State Electronics, 43 (1999) pp. 1095-1099.
Huang, Sheng-Yang, et al., "Development of a Titanium Dioxide-Supported Platinum Catalyst with Ultrahigh Stability for Polymer Electrolyte Membrane Fuel Cell Applications," J. Am. Chem. Soc., 131 (2009) pp. 13898-13899.
Wei, Z.D., et al., "Electrochemically Synthesized Cu/Pt Core-Shell Catalysts on a Porous Carbon Electrode for Polymer Electrolyte Membrane Fuel Cells," Journal of Power Sources, 180 (2008) pp. 84-91.
Taylor, Marie N., et al., "Synergy Between Tungsten and Palladium Supported on Titania for the Catalytic Total Oxidation of Propane," Journal of Catalysis, 285 (2012) pp. 103-114.
Guerin, Samuel, et al., "Physical Vapor Deposition Method for the High-Throughput Synthesis of Solid-State Material Libraries," J. Comb. Chem., 8 (2006) pp. 66-73.
Jiang, Luhua, et al., "Highly Active Core-Shell PtSnOx Nanocatalyst ." (in or after 2003).
Debe, Mark, "Electrocatalyst Approaches and Challenges for Automotive Fuel Cells," Nature, 486 (Jun. 7, 2012) pp. 43-51.
Beard, K.D., et al., "Preparation and Structural Analysis of Carbon-Supported Co Core/Pt Shell Electrocatalysts Using Electroless Deposition Methods," vol. 3, No. 9, American Chemical Society (2009) pp. 2841-2853.
Vasic, Dragana, D., "DFT Study of Platinum and Palladium Overlayers on Tungsten Carbide: Structure and Electrocatalytic Activity Toward Hydrogen Oxidation/Evolution Reaction," International Journal of Hydrogen Energy, 38 (2013) pp. 5009-5018.
Yang, Hua, et al., "Synthesis and Characterization of Tungsten Oxide-Doped Titania Nanocrystallites," Materials Letters, 57 (2002) pp. 674-678.
Zheng, Fulin, et al., "Facile Design of Au@Pt Core-Shell Nanostructures: Formation of Pt Submonolayers with Tunable Coverage and Their Applications in Electrocatalysis," Nano Research, 7(3) (2014) pp. 410-417.
Wang, Rongfang, et al., "Heterostructure Core $PdSn-SnO_2$ Decorated by Pt as Efficient Electrocatalysts for Ethanol Oxidation," International Journal of Hydrogen Energy, 33 (2013) pp. 13604-13610.
Sun, Xiaolian, et al., "Core/Shell Au/CuPt Nanoparticles and Their Dual Electrocatalysis for both Reduction and Oxidation Reactions," J. Am. Chem. Soc., 136 (2014) pp. 5745-5749.
Ishihara, Akimitsu, et al., "Progress in Non-Precious Metal Oxide-Based Cathode for Polymer Electrolyte Fuel Cells," Electrochimica Acta, 55 (2010) pp. 8005-8012.
Rinaldo, Steven G., et al., "Physical Theory of Platinum Nanoparticle Dissolution in Polymer Electrolyte Fuel Cells," J. Phys. Chem. C., 114 (2010) pp. 5773-5785.
Koh, Joon-Ho, et al., "Design and Synthesis of Degradation-Resistant Core-Shell Catalysts for Proton Exchange Membrane Fuel Cells," Journal of Power Sources, 261 (2014) pp. 271-277.
Adzic, Radoslav, et al., "IV.C.3 Low Platinum Loading Catalysts for Fuel Cells," DOE Hydrogen Program, (2004) pp. 384-388.
Choi, Insoo, et al., "Synthesis of an Active and Stable $Pt_{shell}$—$PD_{core}$/C Catalyst for the Electro-Oxidation of Methanol," International Journal of Hydrogen Energy, 39 (2014) pp. 3681-3689.
Yang, Xiaojing, et al., Carbon-Supported $Ni_{1-x}$@$Pt_x$ (x=0.32, 0.43, 0.60, 0.67, and 0.80) Core-Shell Nanoparticles as Catalysts for Hydrogen Generation from Hydrolysis of Ammonia Borane, International Journal of Hydrogen Energy, 36 (2011) pp. 1984-1990.
Wu, Jianbo, et al., "Pt@Nb—$TiO_2$ Catalyst Membranes Fabricated by Electrospinning and Atomic Layer Deposition," ACS Catal, 4 (2014) pp. 144-151.
Kwak, Byeong, et al., "Hydrogen Production from Ethanol Steam Reforming Over Core-Shell Structured $Ni_xO_y$-, $FeO_xO_y$- and $Co_xO_y$—Pd Catalysts," International Journal of Hydrogen Energy, 35 (2010) pp. 11829-11843.
Yao, Lianghong, et al., "Core-shell Structured Nickel and Ruthenium Nanoparticles: Very Active and Stable Catalysts for the Generation of $Co_x$-free Hydrogen via Ammonia Decomposition," Catalysis Today, (2010).
Liu, Yan-Ting, et al., "Electrochemical Activity and Stability of Core-Shell $Fe_2O_3$/Pt Nanoparticles for Methanol Oxidation," Journal of Power Sources, 243 (2013) pp. 622-629.
Karim, N.A., et al., "An Overview on Non-Platinum Cathode Catalysts for Direct Methanol Fuel Cell," Applied Energy, 103 (2013) pp. 212-220.
Nava, N., et al., "Tin-Platinum Catalysts Interactions on Titania and Silica," Applied Surface Science, 253 (2007) pp. 9215-9220.
Matin, Md. Abdul, et al., "One-Pot Sonication-Assisted Polyol Synthesis of Trimetallic Core-Shell (Pd,Co)@Pt Nanoparticles for Enhanced Electrocatalysis," International Journal of Hydrogen Energy, 39 (2014) pp. 3710-3718.
Lee, Jong-Min, et al., "$TiO_2$@Carbon Core-Shell Nanostructure Supports for Platinum and their Use for Methanol Electrooxidation," Carbon, 48 (2010) pp. 2290-2296.

(56) References Cited

OTHER PUBLICATIONS

Hwang, Seung Jun, et al., "Supported Core@Shell Electrocatalysts for Fuel Cells: Close Encounter with Reality," Scientific Reports, 3 (2013) pp. 1038-1309.
Kokkinidis, Georgios, et al., "Electroless Deposition of Pt on Ti Part II. Catalytic Activity for Oxygen Reduction," Journal of Electroanalytical Chemistry, 511 (2001) pp. 20-30.
Dang, Dai, et al., "A Pulse Electrochemical Deposition Method to Prepare Membrane Electrode Assemblies with Ultra-Low Anode Pt Loadings through in situ Construction of Active Core-Shell Nanoparticles on an Electrode," Journal of Power Sources, 260 (2014) pp. 27-33.
Liu, Minmin, et al., "PdAg Nanorings Supported on Graphene Nanosheets: Highly Methanol-Tolerant Cathode Electrocatalyst for Alkaline Fuel Cells," Adv. Funct. Mater., 23 (2013) pp. 1289-1296.
Aaltonen, Titta, et al., "Atomic Layer Deposition of Platinum Thin Films," American Chemical Society, (2003) pp. 1924-1928.
Wagner, Frederick T., et al., "What Performance would Non-Pt Cathode Catalysts Need to Achieve to be Practical for Transportation?" DOE Workshop on Non-Platinum Electrocatalysts, New Orleans (2003).
Katsounaros, I., et al., "Hydrogen Peroxide Electrochemistry on Platinum: Towards Understanding the Oxygen Reduction Reaction Mechanism," Phys. Chem. Chem. Phys., 14 (2012) pp. 7384-7391.
Takasu, Yoshio, et al., "Oxygen Reduction Characteristics of Several Valve Metal Oxide Electrodes in $HClO_4$ Solution," Electrochimica Acta, 55 (2010) pp. 8220-8229.
"Surface Area of Platinum Catalysts—Determination of Metal Particle Size," Platinum Metals Rev., 4 (1960) pp. 92-93.
Wang, Xiao-Liang, et al., "$Sn/SnO_x$ Core-Shell Nanospheres: Synthesis, Anode Performance in Li Ion Batteries, and Superconductivity," J. Phys. Chem., 114 (2010) pp. 14697-14703.
Choi, Insoo, et at, "Preparation of $Pt_{shell}$—$Pd_{core}$ nanoparticle with electroless deposition of copper for polymer electrolyte membrane fuel cell," Applied Catalysis B: Environmental, 102 (2011) pp. 608-613.
Ahluwalia, Rajesh K., et al., "Dynamics of Particle Growth and Electrochemical Surface Area Loss due to Platinum Dissolution," Journal of The Electrochemical Society, 161 (2014) pp. F291-F304.
"V.E.5 Advanced Cathode Catalysts," DOE Hydrogen Program, FY 2010 Annual Progress Report, pp. 816-824.
Meier, J., et al., "Nano-scale effects in electrochemistry," Chemical Physics Letters, 390 (2004) pp. 440-444.
Garsany, Y., et al., "Experimental Methods for Quantifying the Activity of Platinum Electrocatalysts for the Oxygen Reduction Reaction," Anal. Chem., 82:15 (2010) pp. 6321-6328.
Chen, Chien Chan, et al., "The Enhancement of Platinum Surface Area by Alumina Template Assistance in Sn/Pt Core-Shell Nano/Sub-Micron Sphere Structure," Ceramics International, 39 (2013) pp. 4369-4375.
Reyes-Rodriquez, J.L., et al., "RRDE Study on Co@Pt/C Core-Shell Nanocatalysts for the Oxygen Reduction Reaction," International Journal of Hydrogen Energy, 38 (2013) pp. 12634-12639.
Kim, Hyo-Won, et al., "Preparation of Supported Ni Catalysts on Various Metal Oxides with Core/Shell Structures and their Tests for the Steam Reforming of Methane," Chemical Engineering Journal, (2010).
Chen, Shengli, et al., "Electrocatalysis under Conditions of High Mass Transport Rate: Oxygen Reduction on Single Submicrometer-Sized Pt Particles Supported on Carbon," J. Phys. Chem. B., 108 (2004) pp. 3262-3276.
Oh, Takkeun, et al., "Effects of Tungsten Oxide Addition on the Electrochemical Performance of Nanoscale Tantalum Oxide-Based Electrocatalysts for Proton Exchange Membrane (PEM) Fuel Cells," Journal of Power Sources, 196 (2011) pp. 6099-6103.
Aryanpour, M., et al., "Tungsten-Doped Titanium Dioxide in the Rutile Structure: Theoretical Considerations," Chem. Mater., 21 (2009) pp. 1627-1635.

Ji, Junhong, et al., "Catalytic Activity of Core-Shell Structured $Cu/Fe_3O_4@SiO_2$ Microsphere Catalysts," Catalysis Today, 158 (2010) pp. 305-309.
Rezaei, M., et al., "Electrochemical nucleation and growth of Pd/PdCo Core-Shell Nanoparticles with Enhanced Activity and Durability as Fuel Cell Catalyst," J. Mater. Chem. A., 2 (2014) pp. 4588-4597.
Serov, Alexey, et al., "Highly Active and Durable Templated Non-PGM Cathode Catalysts Derived from Iron and Aminoantipyrine," Electrochemistry Communications, 22 (2012) pp. 53-56.
Zhang, J., et al., "Platinum Monolayer on Nonnoble Metal-Noble Metal Core-Shell Nanoparticle Electrocatalysts for $O_2$ Reduction," The Journal of Physical Chemistry B Letters, 109 (2005) pp. 22701-22704.
Mayrhofer, K.J.J., et al., "Measurement of Oxygen Reduction Activities via the Rotating Disc Electrode Method: From Pt Model Surfaces to Carbon-Supported High Surface Area Catalysts," Electrochimica Acta, 53 (2008) pp. 3181-3188.
Qi, Dawei, et al., "Development of Core-Shell Structure $Fe_3O_4@Ta_2O_5$ Microspheres for Selective Enrichment of Phosphopeptides for Mass Spectrometry Analysis," Journal of Chromatography A, 1216 (2009) pp. 5533-5539.
Guillen-Villafuerte, O., et al., Preliminary Studies of the Electrochemical Performance of $Pt/X@MoO_3/C$ ($X=Mo_2C$, $MoO_2$, $Mo^0$) Catalysts for the Anode of a DMFC: Influence of the Pt Loading and Mo-Phase, International Journal of Hydrogen Energy, 38 (2013) pp. 7811-7812.
Fresno, Fernando, et al., "Synthesis of $Ti_{1-x}Sn_xO_2$ Nanosized Photocatalysts in Reverse Microemulsions," Catalysis Today, 143 (2009) pp. 230-236.
Zhang, J., et al., "Platinum Monolayer Electrocatalysts for $O_2$ Reduction: Pt Monolayer on Pd(111) and on Carbon-supported Pd Nanoparticles," J. Phys. Chem. B, 108 (2004) pp. 109055-10964.
Kim, Jin Yong, et al., "A Novel Non-Platinum Group Electrocatalyst for PEM Fuel Cell Application," International Journal of Hydrogen Energy, 36 (2011) pp. 4557-4564.
Krysa, Josef, et al., "$6^{th}$ European Meeting on Solar Chemistry and Photocatalysis: Environmental Applications," Photochemical & Photobiological Sciences, 3 (2011).
Kim, Do-Young, et al., "Core-Shell NanoStructure Supported Pt Catalyst with Improved Electrocatalytic Stability in Oxygen Reduction Reaction," Materals Chemistry and Physics, 137 (2013) pp. 704-708.
Vukmirovic, M.B., et al., "Platinum Monolayer Electrocatalysts for Oxygen Reduction," Electrochimica Acta, 52 (2007) pp. 2257-2263.
Imai, H., et al., "Structural Defects Working as Active Oxygen-Reduction Sites in Partially Oxidized Ta-Carbonitride Core-Shell Particles Probed by Using Surface-Sensitive Conversion-Electron-Yield X-Ray Absorption Spectroscopy," Applied Physics Letters, 96 (2010) p. 191905-1.
Couselo, Natalia, et al., "Tungsten-Doped $TiO_2$ vs Pure $TiO_2$ Photocatalysts: Effects on Photobleaching Kinetics and Mechanism," J. Phys. Chem. C., 112 (2008) pp. 1094-1100.
Li, Guodong, et al., "Noble Metal Nanoparticle@Metal Oxide Core/Yolk-Shell Nanostructures as Catalysts Recent Progress and Perspective," Nanoscale, 6 (2014) pp. 3995-4011.
Mackus, Adriaan J.M., et al., "Influence of Oxygen Exposure on the Nucleation of Platinum Atomic Layer Deposition: Consequences for Film Growth, Nanopatterning and Nanoparticle Synthesis," Chem. Mater., 25 (2013) pp. 1905-1911.
Yeung, Connie Mei Yu, et al., "Some Optimization in Preparing Core-Shell Pt-Ceria Catalysts for Water Gas Shift Reaction," Journal of Molecular Catalysis A: Chemical, 322 (2010) pp. 17-25.
Li, Wenzhen, et al., "Nano-Structed Pt—Fe—C as Cathode Catalyst in Direct Methanol Fuel Cell," Electrochimica Acta, 49 (2004) pp. 1045-1055.
Fuchs, Harald, et al., "Analysis, Manipulation, and Simulation on the Nanoscale," Phys. Chem. Chem. Phys., 2008.
Chattopadhyay, Jayeeta, et al., Performance of Tin Doped Titania Hollow Spheres as Electrocatalysts for Hydrogen and Oxygen Production in Water Electroylis., International Journal of Hydrogen Energy, 33 (2008) pp. 3270-3280.

(56) References Cited

OTHER PUBLICATIONS

EG&G Technical Services, Inc., "Fuel Cell Handbook (Seventh Edition)," U.S. Dept. of Energy, 2004.

Rao, Chepuri R.K., et al., "Electroless Deposition of Platinum on Titanium Substrates," Materials Chemistry and Physics, 68 (2001) pp. 62-65.

V.E.1. Polymer Electrolyte Fuel Cell lifetime Limitations: The Role of Electrocatalyst Degradation, DOE Hydrogen and Fuel Cells Program, FY 2011 Annual Progress Report, pp. 783-787.

Wieckowski, A. et al., "Catalysis and Electrocatalysis at Nanoparticle Surfaces," (2009) pp. 347, 384.

Pernstich, Kurt P., et al., "Electroless Plating of Ultrathin Films and Mirrors of Platinum Nanoparticles onto Polymers, Metals, and Ceramics," ACS Applied Materials & Interfaces, 2:3 (2010) pp. 639-643.

An, Jihwan, et al., "Ultra-thin Platinum Catalytic Electrodes Fabricated by Atomic Layer Deposition," Phys. Chem. Chem. Phys., 15 (2013) pp. 7520-7525.

Adzic, R. R., et al., "Platinum Monolayer Fuel Cell Electrocatalysts," Top Catal, 46 (2007) pp. 249-262.

Shrestha, Sujan, et al., "Electrocatalytic Activity and Stability of Pt Clusters on State-of-the-Art Supports: A Review," Catalysis Reviews: Science and Engineering, 53:3 (2011) pp. 256-336.

Norskov, J.K., et al., "Origin of the Overpotential for Oxygen Reduction at a Fuel-Cell Cathode," J. Phys. Chem. B., 108 (2004) pp. 17886-17892.

Adzic, Radoslav, et al., "Metal and Metal Oxide-Supported Platinum Monolayer Electrocatalysts for Oxygen Reduction" (in or after 2007).

Klaiber, Thomas, "Fuel Cells for Transport: Can the Promise be Fulfilled? Technical Requirements and Demands from Customers," Journal of Power Sources, 61 (1996) pp. 61-69.

Jang, Ji-Hoon, et al., "Rational Syntheses of Core-Shell Fex@Pt Nanoparticles for the Study of Electrocatalytic Oxygen Reduction Reaction," Scientific Reports, 3 (2013) pp. 1-8.

"Cell Component Accelerated Stress Test and Polarization Curve Protocols for Polymer Electrolyte Membrane Fuel Cells," U.S. Drive Partnership: Fuel Cell Technical Team (2010), pp. 1-8.

Hsieh, Yu-Chi, et al., "Ordered Bilayer Ruthenium-Platinum Core-Shell Nanoparticles as Carbon Monoxide-Tolerant Fuel Cell Catalysts," Nature Communications, 4 (2013), pp. 1-9.

Wang, Chen-Hao, et at., "Iridium-Decorated Palladium-Platinum Core-Shell Catalysts for Oxygen Reduction Reaction in Proton Exchange Membrane Fuel Cell," Journal of Colloid and Interface Science, 427 (2014) pp. 91-97.

Sanchez-Padilla, N. M., et al., Fast Synthesis and Electrocatalytic Activity of M@Pt (M = $Ru_1Fe_3O_4$ $_1$Pd) Core-Shell Nanostructures for the Oxidation of Ethanol and Methanol, International Journal of Hydrogen Energy, (2012) pp. 1-8.

Markovic' et al., "Catalysis and Electrocatalysis at Nanoparticle surfaces," Physical and Electrochemical Characterization, pp. 312-313.

\* cited by examiner

US 9,837,668 B2

COST-EFFECTIVE CORE-SHELL CATALYST WITH HIGH ELECTROCHEMICAL STABILITY

CROSS-REFERENCE TO RELATED APPLICATIONS

This application is a national phase application of International Application No. PCT/EP2011/062768, filed Jul. 25, 2011, the content of which is incorporated herein by reference.

The present invention relates to a core-shell composite material that may in particular find application in fuel cells, as well as processes that may be used to prepare the core-shell composite material.

BACKGROUND OF THE INVENTION

In typical low temperature fuel cells, of considerable interest in the automotive field, hydrogen ($H_2$), or an organic material with high hydrogen content, supplied to the anode, is oxidized with the release of electrons, whilst at the cathode, oxygen ($O_2$) is reduced. Platinum (Pt) is a highly active material acting as a catalyst in such fuel cells, and can be used at both the cathode and anode. At the cathode, platinum catalysts are commonly employed to assist in the oxygen reduction reaction (ORR).

Conventional fuel cell catalysts are typically based on Pt or Pt-alloy nanoparticles deposited on carbon supports. However, the high cost of these materials and limited electrochemical stability impede their use in commercial fuel cell powered devices. Very fine platinum (Pt) particle dispersions (1 to 2 nm) have been considered to minimize the precious metal loading without losing catalyst activity. However the ORR activity of Pt-catalysts is particle size dependent: the maximum mass activity is obtained with 3 to 4 nm Pt particles. An optimal mass/cost benefit with an ultra-fine Pt dispersion has thus not been achieved. A Pt (or Pt-alloy) particle deposited on a carbon-type support is illustrated in FIG. 1. Such a system has a maximum mass activity and specific activity for particles of 3-4 nm, impeding the cost-effective reduction of Pt loading via a finer dispersion (particle diameter <3 nm). The Pt-based catalyst suffers from dissolution and sintering, while the carbon support is subject to corrosion.

Recently, to reduce the Pt loading by enhancing Pt utilization and activity, some groups have developed core-shell nano-catalysts based on a precious metal core or a base metal core (such as nickel). With a precious metal core, the resulting material is still expensive, but a base metal core risks being unstable in an electrochemical and acid environment.

Examples of core-shell type catalysts are described in US20100197490, US20070031722, and US20090117257. This type of system is shown schematically in FIG. 2, being based on a Pt shell and a noble metal core. This enhances the catalytic activity but does not provide reasonable cost. A core-shell type catalyst, as described in CN101455970 and shown schematically in FIG. 3, based on a Pt shell and a transition metal core, enhances catalytic activity but does not provide reasonable electrochemical stability. The core-shell type catalyst described in US20060263675, and shown schematically in FIG. 4, based on a Pt shell and a bronze $WO_3$ core, offers a possible solution to the durability issue, but no evidence is provided. With a Pt shell limited to very few atomic layers (<3) the ORR activity could suffer a large overpotential, due to a strong interaction between the oxide substrate and the Pt overlayer.

SUMMARY OF THE INVENTION

It has now been found that a core-shell composite material comprising an Nb-doped $TiO_2$ core and a shell consisting of a few atomic layers of Pt, or Pt alloy, can provide a cost-effective alternative to existing Pt-based fuel cell catalysts, whilst providing electrochemical stability and electrical conductivity. The proposed new core-shell catalyst has ORR activities provided by the Pt thin shell that are comparable to that of a polycrystalline Pt thin film and excellent electrochemical stability provided by the oxide core. The core-shell composite materials according to the invention may be prepared in the form of a thin film with a planar underlying Nb-doped $TiO_2$ layer and a planar overlying Pt or Pt alloy layer. The core-shell composite materials according to the invention may also be prepared in the form of a particle, wherein the core is an Nb-doped $TiO_2$ nanoparticle having a particle diameter of at least 2 nm and at most 100 nm, and the shell, deposited on the surface of the Nb-doped $TiO_2$ nanoparticle core, is a Pt or Pt alloy. The latter, "nanoparticle" aspect of the present invention is schematically illustrated in FIG. 6.

In the present invention, an essentially homogeneous layer of Pt or Pt alloy, not consisting of discrete Pt or Pt alloy particles, is laid down on the underlying layer/core of Nb-doped $TiO_2$.

Thus, the present invention relates to a core-shell composite material comprising:
  a core consisting of Nb-doped $TiO_2$ of formula $TiNbO_x$; and
  a shell consisting of a homogeneous layer of Pt or Pt alloy of 1 to 50 ML in thickness.

The unit ML (monolayer) corresponds to a thickness in terms of numbers of atoms. More precisely, in this context, a monolayer (ML) corresponds to the number of equivalent monolayers of platinum (Pt) should the platinum grow in it usual face-centred cubic (FCC) structure, i.e. 1 ML corresponds to one atomic layer of Pt growing in the face-centred cubic structure.

The present invention also relates to a process for the preparation of a core-shell composite material comprising the steps of:
  (1) preparation of a $TiNbO_x$ core, which may be in the form of a thin film or a (nano)particle;
  (2) chemical reduction of the surface of the $TiNbO_x$ core;
  (3) deposit of a homogeneous layer of platinum or platinum alloy on the reduced surface of the $TiNbO_x$ core obtained in step (2).

DETAILED DESCRIPTION OF THE INVENTION

Figure 1:
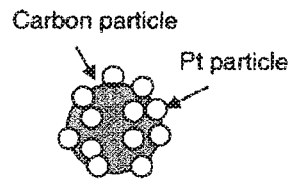
FIG. 1 shows the conventional catalyst: Pt (or Pt-alloy) particles deposited on a carbon-type support as is commercially available.
Figure 2:
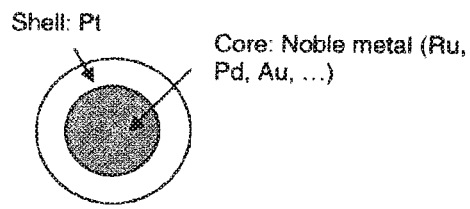
FIG. 2 shows a core-shell catalyst based on Pt shell on precious metal core (as known from US2010197490, US2007031722, US2009117257)
Figure 3:
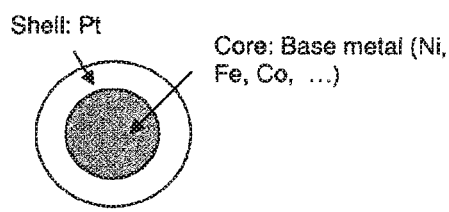
FIG. 3 shows a core-shell catalyst based on a Pt shell on a base metal core (as known from CN101455970)
Figure 4:
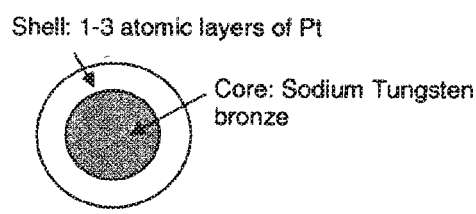
FIG. 4 shows a core-shell catalyst based on a Pt shell and bronze $WO_3$ oxide core (as known from US20060263675)
Figure 5:
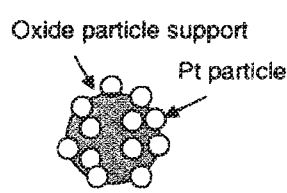
FIG. 5 shows a Pt-particle catalyst on oxide support as disclosed in embodiments of international application PCT; EP 2010/005907 (filed 28 Sep. 2010)
Figure 6:
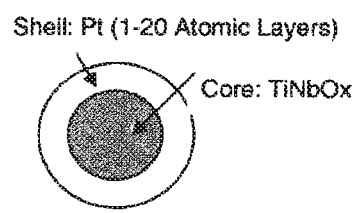
FIG. 6 shows a schematic representation of a core-shell particle composite material according to the "nanoparticle" aspect of the present invention.

The present invention relates to a core-shell composite material comprising:
- a core consisting of Nb-doped $TiO_2$ of formula $TiNbO_x$; and
- a shell consisting of a homogeneous layer of Pt or Pt alloy of 1 to 50 ML in thickness.

In a preferred process for preparing a core-shell particle composite material according to the present invention, the following steps are carried out, step (2) being a preferred intermediate stage between the preparation of the $TiNbO_x$ core and the deposition of the Pt/Pt alloy shell:
(1) Preparation of the $TiNbO_x$ core, which may be in the form of a thin film or a (nano)particle;
(2) Chemical reduction of the surface of the $TiNbO_x$ core;
(3) Deposition of a homogeneous layer of platinum or platinum alloy.

Generally applicable and/or advantageous embodiments both with respect to the composition of the core and shell layers, as well as processes for preparing them, will be presented hereinunder. It is to be understood that the present application encompasses any combination of generally applicable and/or advantageous embodiments described in what follows.

In both the "thin film" and "nanoparticle" aspects of the present invention, it is preferred to have at most 25 at. % Nb in the $TiNbO_x$ core/layer. It is to be noted that herein this atomic percentage is defined on a metallic basis, i.e. excluding oxygen, and therefore the atomic percentage of niobium (at. % Nb) gives a relative number of niobium (Nb) atoms compared to the total number of Nb+Ti atoms in the $TiNbO_x$ core/layer. Preferably the amount of Nb is at least 1 at % and at most 15 at % on a metal basis, excluding the oxygen content.

Also, in both the "thin film" and "nanoparticle" aspects of the present invention, it is preferred for the $TiNbO_x$ to be in the rutile phase. In effect, it is believed that amorphous $TiNbO_x$ is likely to provide materials with instability with respect to the acid environment. It is therefore preferred to have a $TiNbO_x$ core/layer as highly crystalline as possible, in the rutile phase.

As regards thin film embodiments of the present invention, a composite oxide layer comprising Nb-doped $TiO_2$ can be synthesized by different methods, for instance PVD methods (i.e. molecular beam deposition, vacuum deposition, ion plating or sputtering) on different types of substrates, such as Si, glass, Si/TiW, etc. Preferably physical vapour deposition from metal sources (titanium and niobium metal) in molecular or oxygen plasma is carried out.

When deposition is carried out, it is preferable to supply oxygen gas at a pressure of $1 \times 10^{-7}$ to $5 \times 10^{-5}$ Torr, and where a plasma is used, with a plasma source power of 300 to 600 W.

Amorphous thin film oxides can be synthesized by depositing the metals whilst using the atomic oxygen plasma source or molecular oxygen without applying any heating to the substrate.

Rutile crystalline composite oxides in film form can be synthesized by heating the substrate at 600 to 800° C. Different oxygen stoichiometries are achievable by depositing the metals using molecular oxygen, or an atomic oxygen plasma source at a power of 400 W, and at a pressure of $5 \times 10^{-7}$ Torr to $5 \times 10^{-6}$ Torr of oxygen.

In "thin film" embodiments of the present invention, a generally advantageous thickness of the $TiNbO_x$ layer is at least 5 nm and at most 1000 nm, preferably at least 5 nm and at most 200 nm, and more preferably at least 5 nm and at most 100 nm.

As regards nanoparticle embodiments of the present invention, oxide core nanoparticles can be can be synthesized by various means known in the art, including solid-state and sol gel, but not limited to those. Suitable solid-state methods for synthesizing metal oxide particles typically include the application of a heating source. For example, particles of $TiNbO_x$ can be produced by heating a combination of the corresponding metal precursors at temperature higher than 1000 K.

Suitable sol gel methods for synthesizing Nb-doped $TiO_2$ powders typically include the hydrolytic reaction between metal alkoxides, metal amides, or metal carboxylates. Hydrolysis of the one or more oxide precursors is generally affected by water and can be further aided by catalytic amounts of an acid or base. For example, Nb-doped $TiO_2$ powders can be prepared by the sol-gel method from the hydrolysis of Ti-isopropoxides and niobium (V) ethoxide. Rutile oxide nanoparticles are obtained after calcination at a temperature of 600 to 1000° C. in an oven under an oxygen atmosphere. Sub-stoichiometric compositions can be obtained in a $H_2$ reducing atmosphere.

Additionally, non-aqueous methods may be advantageous for the synthesis of these core-shell structures. These methods allow better control of a reduced and un-hydroxylated surface to facilitate the formation of the Pt shell. These methods include:

a) Direct physical vapour deposition (PVD) of the platinum shell onto the Nb-doped $TiO_2$ core;
b) Electroless Pt deposition in non-aqueous reducing electrolytic environments directly onto nanoparticle suspensions of the Nb-doped $TiO_2$ core;
c) Chemical Fluid Deposition (for example using supercritical $CO_2$) directly onto nanoparticle suspensions of the Nb-doped $TiO_2$ core.

Concerning the "thin film" and "nanoparticle" aspects of the present invention, it is considered that thin films with an underlying $TiNbO_x$ layer and an overlying (homogeneous) Pt (or Pt alloy) layer show electrocatalytic behavior of the same type as that which will be observed for core-shell systems in which a (homogeneous) Pt (or Pt alloy) shell is laid down on a $TiNbO_x$ (nano)particle core. The thin films may thus be considered a model system which the present inventors consider accurately reflects the properties of (nano)particulate core-shell catalysts with the same chemical nature.

Figure 22:
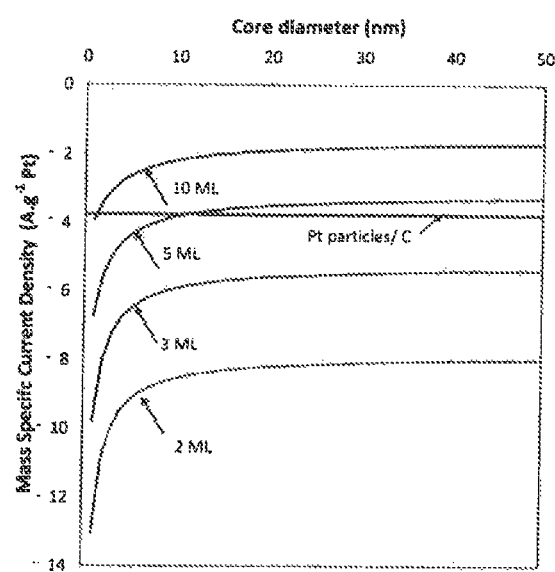
FIG. 22 shows the mass specific current density versus core diameter for various Pt shell thicknesses, assuming a current density of 7.5 µA/cm$^2$. The maximum value obtained for 3-4 nm particles of Pt on carbon is shown with the horizontal line.

Assuming that the current density obtained on the thin film is at least as high as the maximum specific current density obtained with Pt particles, it is possible to calculate a theoretical value for the mass specific current density, for varying thicknesses of Pt shell on varying core diameters. Such calculations lead to the conclusion that if the film of Pt is less than approximately 5 ML in thickness then an improvement in the mass specific current density should be observed over that seen for the optimal catalyst (3 to 4 nm particles) of carbon-supported Pt particles. Furthermore, in the case that the core diameter can be markedly reduced, it is expected that this would provide additional enhancement in mass specific current density. FIG. 22 illustrates this trend.

Consequently, in the (nano)particle aspect of the present invention, it is preferred for the $TiNbO_x$ (nano)particle core to have a particle diameter of at least 2 nm and at most 500 nm, preferably at least 2 nm and at most 100 nm, and most preferably at least 2 nm and at most 50 nm. Concerning the measurement of particle diameters, there are many conventional ways to measure particle diameters lower than 500 nm. For instance this can be measured by diffraction techniques (X-ray Diffraction, Low Angle Laser Light Scattering), electron microscopy techniques (TEM/SEM), adsorption techniques (BET). In the present invention, where methods may give somewhat different results, particle size shall be as observed by X-ray Diffraction (XRD).

In a preferred process step, labelled step (2) above, chemical reduction of the oxide surface is carried out. The aim here is to chemically reduce the surface of the Nb-doped $TiO_2$ oxide core/layer for particle/thin film embodiments, without significant reduction of the underlying bulk of the oxide core/layer. Reduction of the bulk of the Nb-doped $TiO_2$ oxide core/layer may lead to electrochemical instability. XPS analysis was used to verify the reduction of the surface whilst X-ray diffraction and ellipsometry were used to confirm that no significant reduction of the bulk has occurred.

The purpose of this reductive pre-treatment is to increase the wetting of the Pt on the surface, and enable a uniform Pt film deposition. The reduction of the oxide surface provides more nucleation sites for Pt, which will be deposited in subsequent step (3). By this means, the surface is covered at the lowest possible "critical thickness" of Pt. The "critical thickness" or "critical film thickness" of Pt herein is the film thickness above which no further reduction in the overpotential of the oxygen reduction reaction (ORR) occurs.

Generally, any surface pre-treatment can be applied that can reduce the surface of the (Nb-doped Ti) oxide without affecting bulk properties. Among specific methods which may advantageously applied may be mentioned:

Annealing in ultra high vacuum (pressure lower than $10^{-9}$ Torr) at high temperature (600 to 1000° C.) for a short time (5 min to 1 hour) depending on the selected temperature. Preferably the temperature is between 750 and 850° C. for a duration of from 20 to 40 min. Currently preferred conditions include treatment at a temperature of about or exactly 800° C. for a duration of about or exactly 30 min.

Annealing in high vacuum ($10^{-5}$ to $10^{-7}$ Torr) $H_2$ at 600 to 1000° C. for a short time (5 min to 1 hour) depending on the selected temperature and pressure. Preferable conditions are a pressure range of $10^{-6}$ to $10^{-5}$ Torr $H_2$ at 650 to 750° C. for 20 to 40 min. Currently preferred conditions include treatment at a (hydrogen) pressure of about or exactly $5 \times 10^{-6}$ Torr $H_2$ at a temperature of about or exactly 700° C. for a duration of about or exactly 30 min.

On rutile $TiNbO_x$ a polycrystalline-Pt thin film behaviour (equivalent, in terms of overpotential for the oxygen reduction reaction (ORR) to bulk or thin film Pt) is achieved by a critical film thickness of about 5.7 equivalent atomic layers in the illustrative experimental examples. By developing a surface reducing treatment on the rutile TiNbOx, the Pt-like behaviour could be achieved by a lower critical thickness, namely 2.8 equivalent atomic layers in the illustrative experimental examples. The mechanism is not fully clear, but it is believed that the surface reduction treatment enhances Pt wetting on the $TiNbO_x$ substrate.

As for step (3) of the overall preparation process described above, i.e. the deposition of platinum or platinum alloy, various methods can be envisaged for depositing layers of Pt or Pt alloy on the oxide cores, among them Atomic Layer Deposition, Chemical Vapor Deposition and Physical Vapor Deposition. In a currently preferred embodiment, deposition from an electron beam source, or "electron gun", may be used, for a duration of 2 to 30 min. The aim of this stage is to prepare a homogenous, as far as possible uniformly deposited Pt (or Pt alloy) layer with a thickness of at least 1 ML (monolayer) and at most 50 ML, preferably at least 2 ML and at most 20 ML, more preferably at least 2 ML and at most 10 ML. In a particularly advantageous embodiment, the preferred Pt (or Pt alloy) layer has a thickness of at least 2 ML and at most 5 ML. The number of equivalent monolayers of deposited Pt is calculated from the deposition rate, which is in turn obtained by depositing thicker calibration films. The thickness of these calibration films is measured directly using optical profilometry or atomic force microscopy. The ultra-thin films can be directly observed by Transmission Electron Microscopy which shows the transition from particles to continuous thin films.

Apart from pure platinum (Pt), a Pt alloy may be used in the framework of the present invention. Such a Pt alloy could be a binary, ternary or quaternary alloy comprising noble metals other than platinum and/or transition metals. Examples of a noble metal other than Pt include ruthenium, osmium, rhodium, iridium, palladium, gold and silver. Examples of transition metals include molybdenum, cobalt, iron, nickel, titanium, tungsten, rhenium, chromium, manganese, niobium and tantalum. In a preferred embodiment, a catalyst layer containing Pt only is used.

In the core-shell composite material according to the present invention, it appears that the Nb dopant provides improved electrical conductivity to the oxide, whilst the rutile structure guarantees its electrochemical stability. The pre-treatment process for oxide reduction at the surface of the oxide provides stability to Pt film on cycling when doped with Nb (the pure rutile $TiO_x$ is less stable).

The core-shell composite material according to the present invention may be used in fuel cells, and more generally any low temperature fuel cell where the cathode process is the reduction of oxygen, including polymer electrolyte membrane fuel cells (PEMFC), and other alcohol fuel cells such as direct methanol fuel cells (DMFC). The core-shell composite material according to the present invention may thus be incorporated into an oxygen-reducing cathode comprising an electrically conductive support upon which is supported a core-shell composite material according to the present invention.

EXAMPLES

1) Preparation and Screening of the Core Material: Thin Film Ti—Nb Oxide Library
Synthesis
A library of thin film Ti—Nb oxide samples in the amorphous and rutile phases were synthesized with a metal dopant concentration of 0-25 at. % Nb and analyzed for their composition, crystallinity, conductivity and stability in acid. Amorphous TiNbOx thin films were prepared at 25° C. in $5.0 \times 10^{-6}$ Torr of molecular oxygen by PVD, whilst rutile films were prepared at 600° C. in $5.0 \times 10^{-6}$ Torr of molecular oxygen across the entire compositional range.

Some of the rutile libraries were submitted to an optimized pre-treatment, to reduce the surface area, prior to Pt deposition.

Crystallinity

Figure 7:
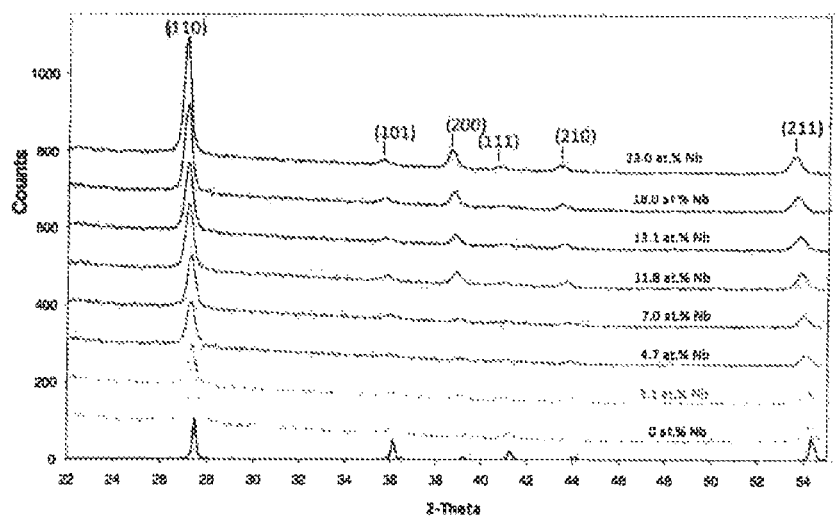
FIG. 7 shows XRD spectra of niobium-doped $TiO_x$ deposited on silicon substrate at 600° C. using molecular $O_2$ at $5.0 \times 10^{-6}$ Torr.
Figure 8:
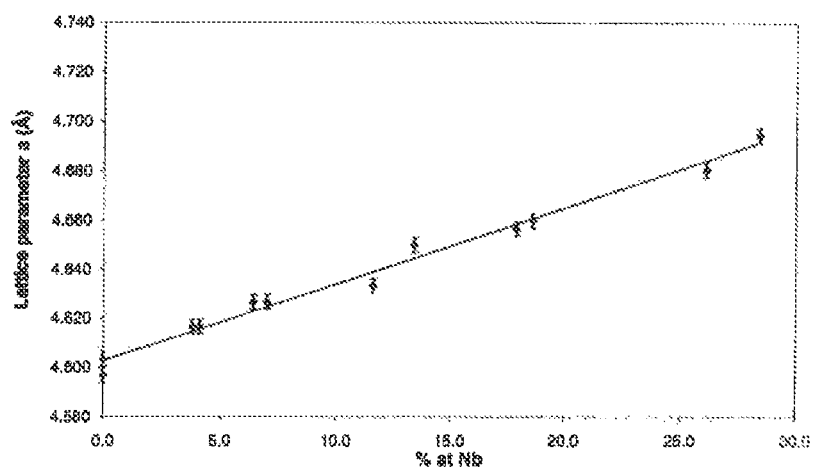
FIG. 8 shows a Vegard plot demonstrating the rutile lattice expansion of niobium-doped titanium oxide deposited on titanium rotating disk electrode (RDE) substrates at 600° C. using $5.0 \times 10^{-6}$ Torr molecular oxygen.

The rutile phase pattern of titanium oxide was observed by XRD with a preferential orientation along the (110) crystal plane. No Nb metal, Nb oxide or $TiNbO_x$ secondary phases were identified, suggesting that the materials consisted of a homogeneous solid solution of Nb in the octahedral sites occupied by the titanium atoms in the $TiO_2$ rutile crystal structure. The XRD data for the samples synthesized is shown in FIG. 7. A linear expansion of the lattice in the [110] direction is observed with increasing Nb concentration which is consistent with Nb substitution for Ti in the rutile, the correlation is reported in FIG. 8.

Stability in Acid

Figure 9:
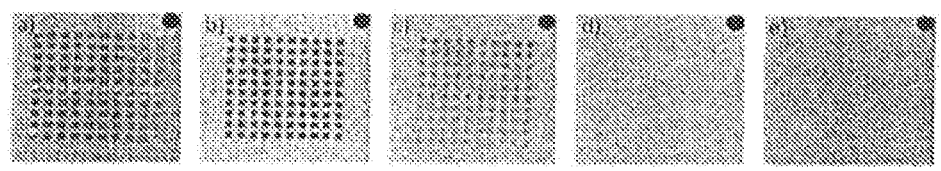
FIG. 9 shows an amorphous $TiNbO_x$ (3.6 to 9.1 at. % Nb) library prepared at 25° C. using $5.0 \times 10^{-6}$ Torr molecular oxygen, after exposure to 0.1 M $H_2SO_4$ at 80° C. for a) 0 hours; b) 2 hours; c) 4 hours; d) 6 hours; e) 24 hours. Each field of the library represents a different Nb composition.
Figure 10:
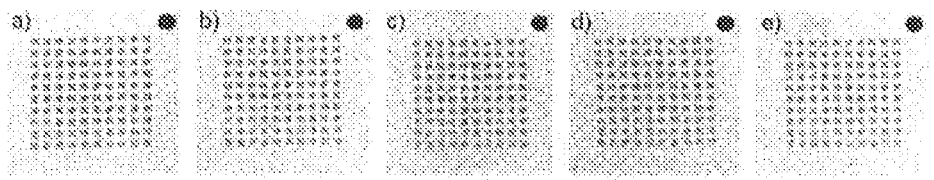
FIG. 10 shows a rutile $TiNbO_x$ (3.1 to 12.8 at. % Nb) library prepared at 600° C. using $5.0 \times 10^{-6}$ Torr molecular oxygen, after exposure to 0.1 M $H_2SO_4$ at 80° C. for a) 0 hours; b) 2 hours; c) 4 hours; d) 6 hours; e) 24 hours. Each dot of the library represents a different Nb composition. The atomic percentage stated is on a metal basis, i.e. excluding the oxygen content.

All rutile films demonstrated resistance to 0.1 M $H_2SO_4$ at 80° C. over a 24 hour period (FIG. 10) whilst all amorphous (FIG. 9) films were seen to be unstable, dissolving fully over the same time period. ICP-MS measurements performed prior to and after the acid exposure showed a relative slight loss of Nb relative to Ti at higher Nb doping levels, which was attributed to the removal of Nb from interstitial sites at greater than ~15 at, % Nb.

Stability tests have been carried out on the rutile $TiNbO_x$ films which have been pre-treated under the same two sets of conditions mentioned above. No visible change was observed for any of the rutile samples which had been annealed at 800° C. in vacuum, or at 700° C. in $5.0 \times 10^{-6}$ Torr of hydrogen, on exposure to the hot acid.

Conductivity

For each of the relevant thin film oxides prepared on the glass substrates, four point probe (4 PP) conductivity measurements were performed in order to obtain their resistivity.

Figure 11:
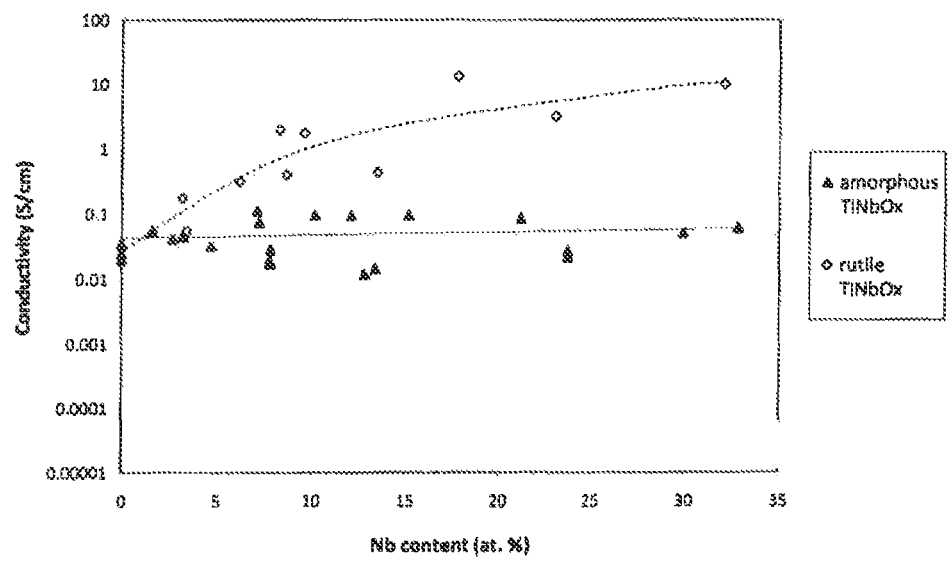
FIG. 11 shows the conductivity of as-deposited $Ti_yNb_{(1-y)}O_x$ films prepared using $5.0 \times 10^{-6}$ Torr of molecular oxygen on glass substrates at 25° C. (amorphous, triangles) and on quartz substrates at 600° C. (rutile, diamonds).

The amorphous and rutile films both had a conductivity of ~0.03 S $cm^{-1}$ for 0 at. % Nb (FIG. 11). Increasing the concentration of the Nb dopant leads to an increased conductivity for the rutile films up to 10 S $cm^{-1}$ at 33 at. %, whilst the addition of Nb has little effect on the conductivity of the amorphous materials.

2) Preparation and Characterization of the Ultrathin Pt Film on the Oxide Libraries
Synthesis Platinum thin films were deposited from an electron gun source onto the relevant oxide-covered samples for electrochemical screening.

Figure 12:
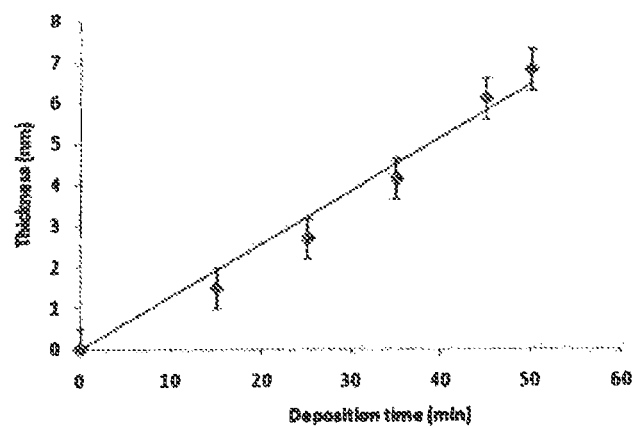
FIG. 12 shows a plot of Pt film thickness versus deposition time, including the linear best fit line used for calibration of the films deposited on the oxide substrates.

For all samples the deposition times varied from 1 to 30 minutes, which produced films with a thickness corresponding to approximately 0.6 to 17 equivalent monolayers (FIG. 12). The films were deposited at 200° C. to dehydroxylate the surface of the doped titania supports and lead to the formation of a stable Pt film.

Characterization of the Pt Deposited Films

Figure 13:
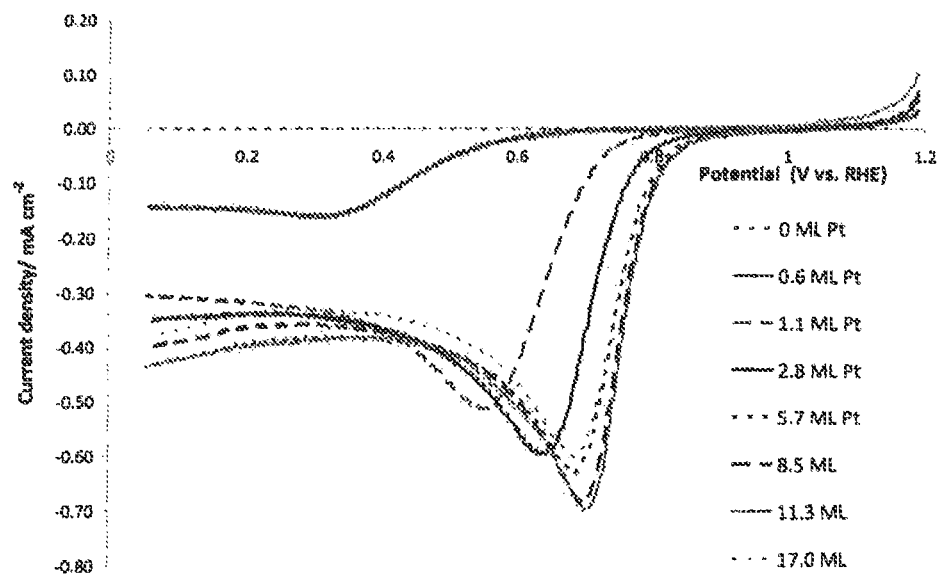
FIG. 13 shows a second negative going cycle of voltammetry performed at 20 mV s$^{-1}$ in oxygenated 0.5 M $HClO_4$ solution, but with no electrode rotation, for a range of different equivalent thicknesses of platinum on the non-reduced $TiNbO_x$ sample with 6.4 at % Nb.

These systems were then investigated for activity towards the ORR and stability on potential cycling in 0.5 M $HClO_4$. Electrochemical screening of the rutile $TiNbO_x$-supported Pt thin films demonstrated (FIG. 13) that the overpotential required for the oxygen reduction reaction (ORR) remained fairly constant at the higher equivalent thicknesses, but at the lowest equivalent thickness was significantly increased.

Pt-polycrystalline behavior is achieved by a film thickness of 5.7 equivalent atomic layers. Above this value little change is observed. For sake of comparison, ultrathin films of Pt on amorphous TiNbO$_x$ required a higher critical film thickness of 8 equivalent atomic layers to achieve a Pt-polycrystalline behavior.

Figure 14:
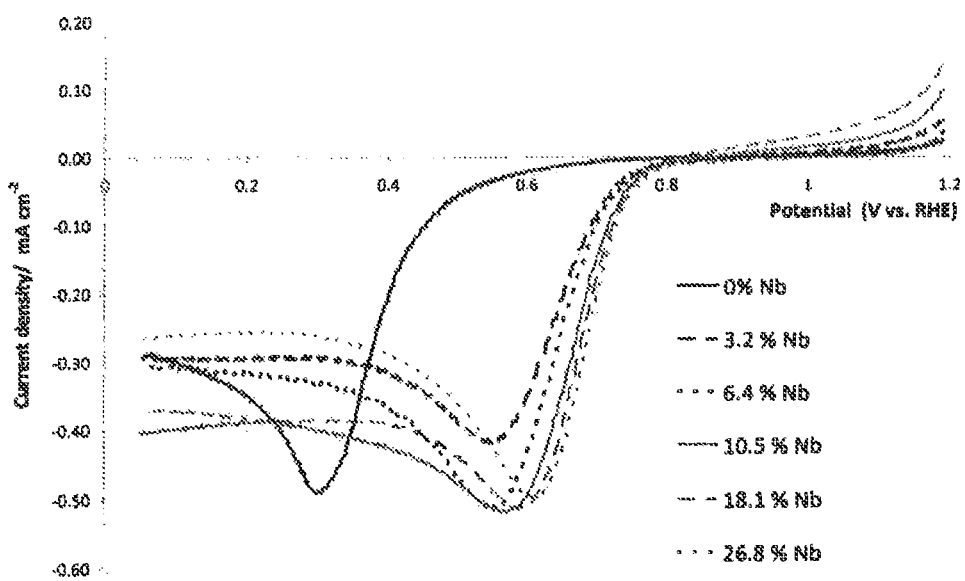
FIG. 14 shows a second negative going cycle of voltammetry performed at 20 mV s$^{-1}$ in oxygenated 0.5 M $HClO_4$ solution, but with no electrode rotation, for 1.1 ML equivalent thickness of platinum on a range of non-reduced $TiNbO_x$ sample with varying niobium content.

It could be observed (FIG. 14) that for very low Pt thickness (1.1 equivalent atomic layer) on rutile oxides the onset potential for oxygen reduction is not significantly different on all of the rutile supports containing niobium, but that the onset for oxygen reduction on rutile titania without any niobium has been shifted to a much lower potential (i.e. the overpotential has increased). This would suggest that the addition of Nb has a positive effect. Moreover, after the addition of a few percent of Nb, no significant further enhancement in activity can be obtained from further addition of Nb above approximately 10 at. %.

Figure 15:
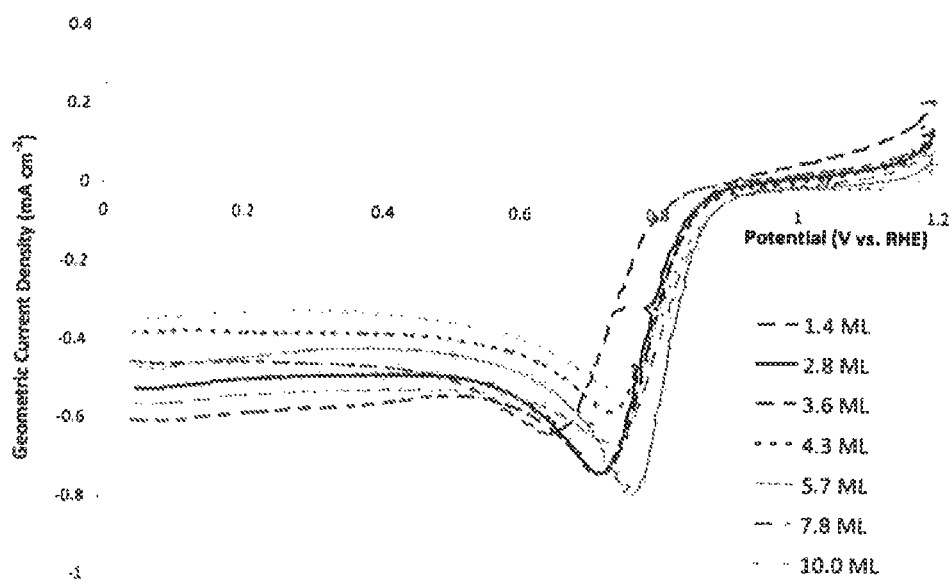
FIG. 15 shows the second negative going cycle of voltammetry performed at 20 mV s$^{-1}$ in oxygenated 0.5 M $HClO_4$ solution, but with no electrode rotation, for a range of different equivalent thicknesses of platinum on rutile $TiNbO_x$ 7 at. % Nb having undergone pre-treatment at 700° C. with $H_2$.

On surface reduced rutile TiNbO$_x$ (FIG. 15) there is not a significant difference in the overpotential for oxygen reduction as the equivalent thickness of platinum is decreased to 2.8 ML (however the lower coverages tend to have the highest overpotentials). Below 2.8 ML equivalent thickness a significant increase in overpotential for the oxygen reduction reaction is seen.

Figure 16:
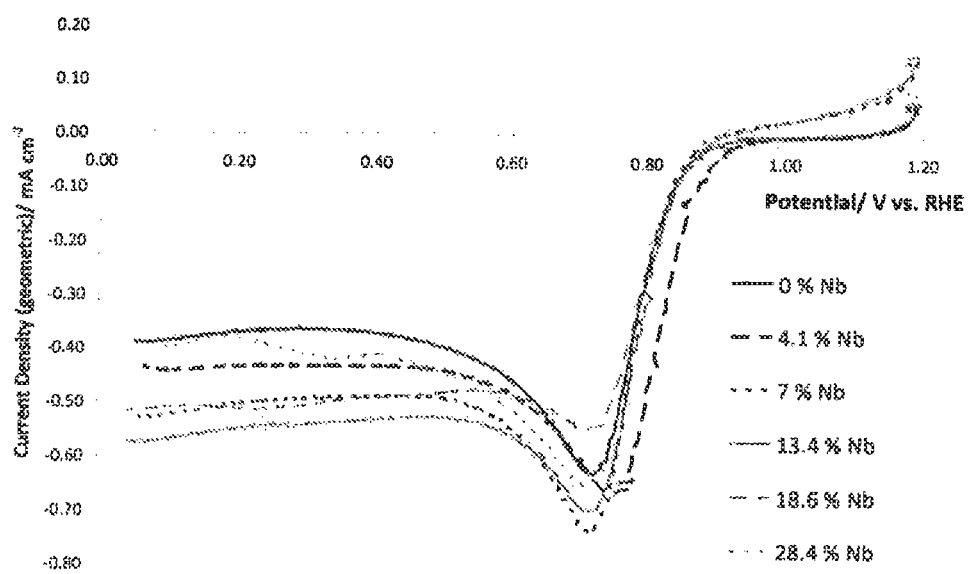
FIG. 16 shows a second negative going cycle of voltammetry performed at 20 mV in oxygenated 0.5 M $HClO_4$ solution, but with no electrode rotation, for 2.8 ML of platinum on ruble $TiNbO_x$ with varying niobium content having undergone pre-treatment at 700° C. with $H_2$.

FIG. 16 shows the oxygen reduction data for a Pt equivalent thickness of 2.8 ML on all of the different rutile TiNbO$_x$ supports which underwent a pre-treatment of 700° C. in H$_2$. All of the electrodes have a very similar overpotential for the oxygen reduction reaction. The electrode with 4.1 at. % Nb has a slightly lower overpotential, suggesting it is slightly more active.

Figure 17:
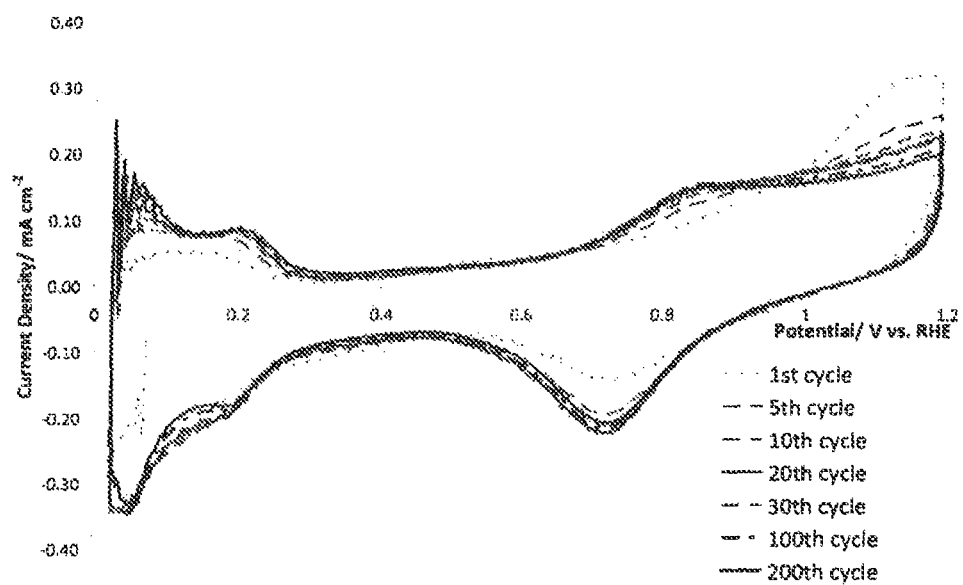
FIG. 17 shows stability cycling voltammetry for non-reduced rutile $TiNbO_x$ with a Nb concentration of 6.4 at. % with an equivalent thickness of Pt of 11.3 ML, performed at 100 mV s$^{-1}$ in 0.5 M $HClO_4$ at 25° C.

Electrochemical Stability 200 cycles from 0.025-1.200 V at 100 mV s were performed in deoxygenated 0.5 M HClO$_4$ on the samples that had previously undergone the O$_2$ reduction experiment procedure outlined above. On most of the non-reduced rutile samples (FIG. 17) after 30 stability cycles the cyclic voltammetry appeared to remain constant. In FIG. 17 for example it can be seen that the 30$^{th}$ 100$^{th}$ and 200$^{th}$ CV cycles for the sample TiNbO$_x$ with 11.4 at. % Nb and 11.3 ML Pt are very similar, suggesting that the platinum and support are fairly stable.

Indeed, the charges associated with hydrogen adsorption/desorption and Pt oxide formation/reduction increase during the first 30 cycles and then stabilise. This could be due to a slight roughening of the surface, or even electrochemical cleaning of the electrode surface.

Figure 18:
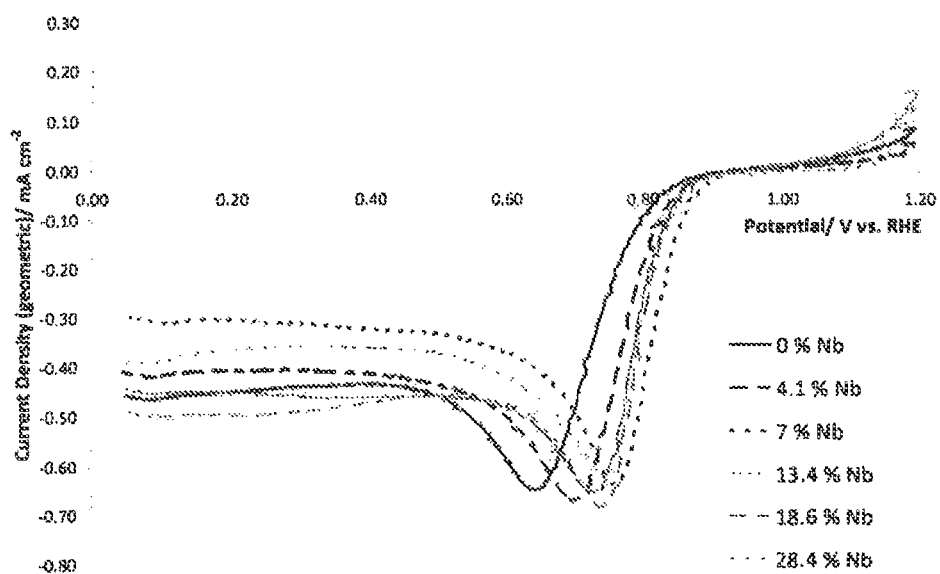
FIG. 18 shows a second negative going cycle of voltammetry performed at 20 mV s$^{-1}$ in oxygenated 0.5 M $HClO_4$ solution, but with no electrode rotation, after stability cycling for an equivalent thickness of 2.8 ML of platinum supported on rutile $TiNbO_x$ with varying Nb content for samples pre-treated at 700° C. in $H_2$.

Stability cycling has demonstrated that the non-reduced rutile films (FIG. 18) with a coverage of <2.8 ML have a high overpotential for the onset of surface oxide reduction (which is intrinsically related to the oxygen reduction potential). There is evidence of sintering of the films of 4.0 and 5.7 ML thickness to form particles, whilst those of 8.5 ML and above demonstrate polycrystalline Pt-like behavior. These are stable on cycling, but show evidence of surface roughening. No significant effect due to the Nb content of the support films was observed.

Figure 19:
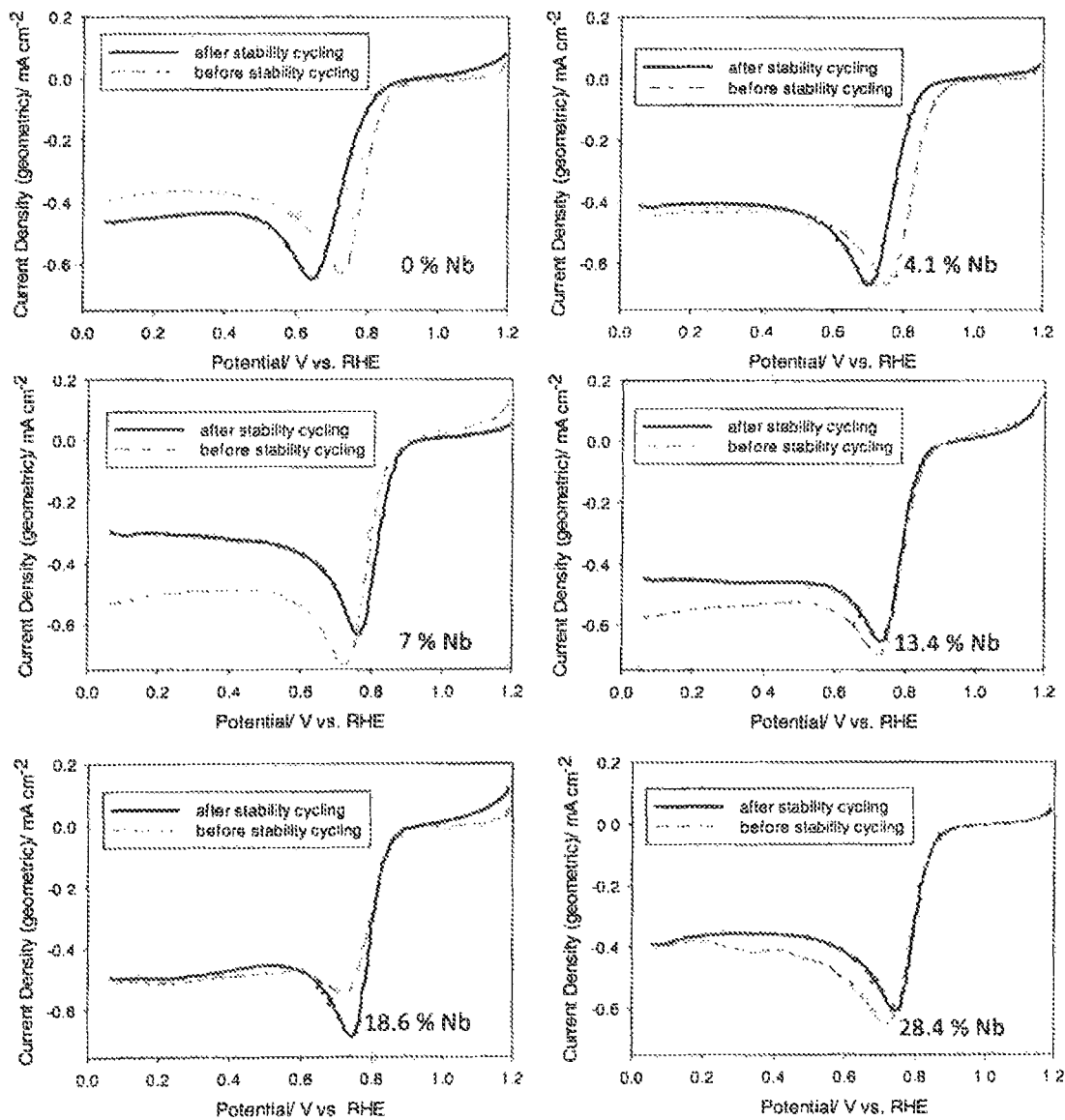
FIG. 19 shows a second negative going cycle of voltammetry performed at 20 mV s$^{-1}$ in oxygenated 0.5 M $HClO_4$ solution, but with no electrode rotation, for an equivalent thickness of 2.8 ML of platinum supported on rutile $TiNbO_x$ with varying Nb content before and after stability cycling for samples pre-treated at 700° C. in $H_2$.

The oxygen reduction data before and after stability cycling for 2.8 ML equivalent thickness of Pt on the full range of supports is shown in FIG. 19. Above 4.1 at. % Nb the overpotential for oxygen reduction does not change (or is shifted to lower overpotential). For both the support with no niobium doping and the support containing 4.1 at. % doping, the overpotential for the oxygen reduction reaction appears to increase after stability cycling. This suggests that with a low level of niobium doping, the electrodes pretreated to 700° C. in H$_2$ are not so stable towards oxygen reduction activity.

Figure 20:
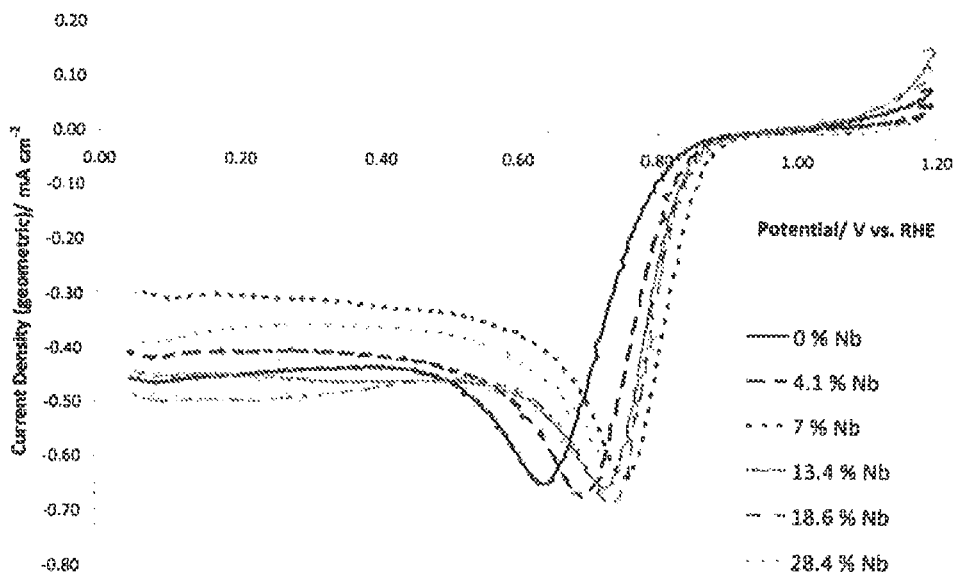
FIG. 20 shows a second negative going cycle of voltammetry performed at 20 mV s$^{-1}$ oxygenated 0.5 M $HClO_4$ solution, but with no electrode rotation, after stability cycling for an equivalent thickness of 2.8 ML of platinum supported on $TiNbO_x$ with varying Nb content for samples pre-treated at 700° C. in $H_2$.

FIG. 20 shows a comparison of the oxygen reduction data after stability cycling for 2.8 ML equivalent thickness of Pt on all of the different reduced rutile TiNbO$_x$ supports. All of the supports containing niobium have a similar overpotential for the reaction after stability cycling (although the support with 4.1% Nb has shifted to the highest overpotential of the supports containing Nb). The electrode containing no niobium doping has the highest overpotential for the reaction after stability cycling, suggesting it is the least active after stability cycling has taken place.

Effect of Pre-Treatment on the ORR Activity

Figure 21:
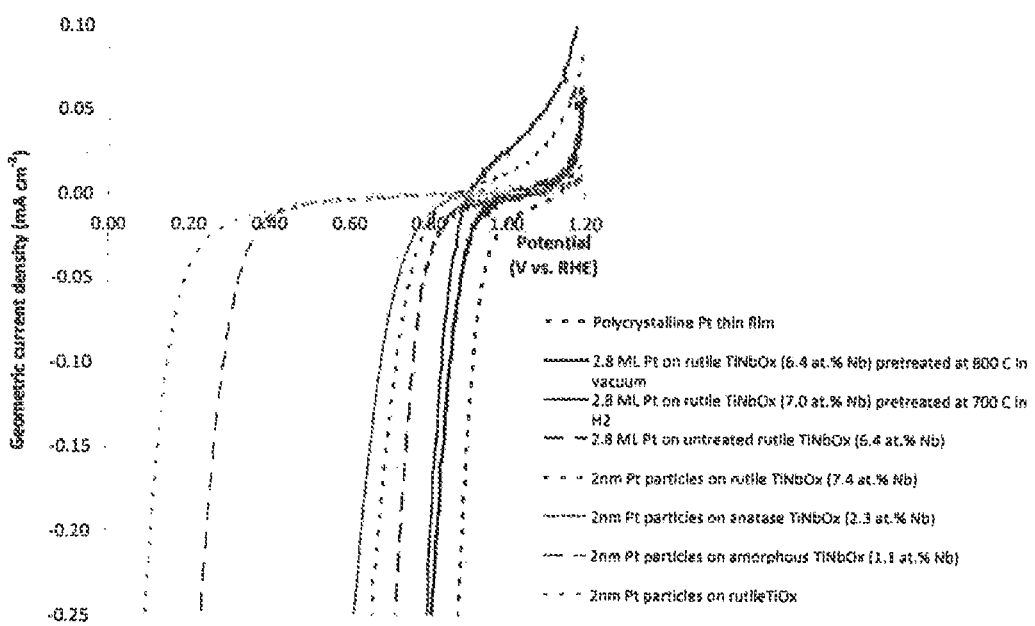
FIG. 21 shows a second negative going cycle of voltammetry performed at 20 mV s$^{-1}$ in oxygenated 0.5 M $HClO_4$ solution at 25° C., but with no electrode rotation for a range of different Pt/$TiNbO_x$ samples.

Finally, FIG. 21 summarizes the oxygen reduction data for a range of different oxide/Pt combinations. This shows the reduction in the overpotential observed, initially from the addition of small amounts of Nb to the support, then due to the crystallization of the support into the anatase and rutile phases, a further enhancement due to the use of the core shell model, and finally due to the preparation of the core shell model catalysts with the surface of the oxide support reduced (using the pre-treatment of the sample under the two selected sets of conditions).

The invention claimed is:

1. A core-shell composite material comprising:
   an inner core consisting of a nanoparticle, wherein said nanoparticle is at least 2 nm and at most 100 nm in diameter and consists of Nb-doped TiO$_2$; and
   an outer shell consisting of a layer of Pt or Pt alloy completely covering said inner core, wherein said layer of Pt or Pt alloy is at least 2 monolayers and at most 20 monolayers in thickness, and does not consist of discrete Pt or Pt alloy particles.

2. The core-shell composite material according to claim 1, wherein the inner core, prior to laying down of the Pt or Pt alloy shell, has been subjected to a process to reduce a surface of the inner core.

3. The core-shell composite material according to claim 2, wherein the process to reduce the surface of the inner core comprises annealing in ultra high vacuum, at a pressure lower than 10$^{-9}$ Torr, at a temperature of 600 to 1000° C., for a duration of 5 minutes to 1 hour.

4. The core-shell composite material according to claim 2, wherein the process to reduce the surface of the inner core comprises treatment in a hydrogen atmosphere of 10$^{-5}$ to 10$^{-7}$ Torr H2, at a temperature of 600 to 1000° C., for a duration of 5 minutes to 1 hour.

5. The core-shell composite material according to claim 1, wherein the amount of Nb in the inner core is at most 25 at % on a metal basis, excluding oxygen.

6. The core-shell composite material according to claim 5, wherein the amount of Nb in the inner core is at least 1 at % and at most 15 at % on a metal basis, excluding oxygen.

7. The core-shell composite material according to claim 1, wherein the Nb-doped TiO$_2$ is in a rutile phase.

8. The core-shell composite material according to claim 1, wherein the thickness of the Pt or Pt alloy shell is at least 2 monolayers and at most 5 monolayers.

9. The core-shell composite material according to claim 1, wherein the inner core is an Nb-doped TiO$_2$ nanoparticle having a particle diameter of at least 2 nm and at most 50 nm.

10. The core-shell composite material according to claim 1, wherein the thickness of the outer shell is at least 2 monolayers and at most 10 monolayers.

11. A process for preparing a core-shell composite material, comprising:
   (1) preparation of an inner core consisting of Nb-doped $TiO_2$, which is in the form of a nanoparticle, wherein said nanoparticle is at least 2 nm and at most 100 nm in diameter;
   (2) chemical reduction of a surface of the inner core;
   (3) depositing an outer shell consisting of a layer of Pt or Pt alloy completely covering the reduced surface of the inner core obtained in step (2), wherein said layer of Pt or Pt alloy is at least 2 monolayers and at most 20 monolayers in thickness and does not consist of discrete Pt or Pt alloy particles.

12. The process according to claim 11, wherein the (2) chemical reduction of the surface of the inner core comprises annealing in ultra high vacuum, at a pressure lower than 10-9 Torr, at a temperature of 600 to 10000 C, for a duration of 5 minutes to 1 hour.

13. The process according to claim 11, wherein the (2) chemical reduction of the surface of the inner core comprises treatment in a hydrogen atmosphere of $10^{-5}$ to $10^{-7}$ Torr $H_2$, at a temperature of 600 to 1000° C., for a duration of 5 minutes to 1 hour.

14. The process according to claim 11, wherein the Nb-doped $TiO_2$ is prepared in a rutile phase.

15. The process according to claim 11, wherein the amount of Nb in the inner core is at most 25 at % on a metal basis, excluding oxygen.

* * * * *